United States Patent [19]

Jackson

[11] 3,954,795

[45] May 4, 1976

[54] PROCESS FOR PREPARING PIGMENTARY β-COPPER PHTHALOCYANINE

[75] Inventor: Julius Jackson, Westfield, N.J.

[73] Assignee: E. I. Du Pont de Nemours and Company, Wilmington, Del.

[22] Filed: May 2, 1975

[21] Appl. No.: 573,993

[52] U.S. Cl. .......................................... 260/314.5
[51] Int. Cl.² ......................................... C09B 47/02
[58] Field of Search ................................. 260/314.5

[56] References Cited
UNITED STATES PATENTS 2,982,666   5/1961   Chun et al. ...................... 260/314.5

Primary Examiner—Harry I. Moatz

[57] ABSTRACT

Improved process for the preparation of copper phthalocyanine in pigmentary form by viscous salt milling crude copper phthalocyanine in the presence of an organic conditioning agent and $FeCl_3$ followed by acid extraction. This process requires substantially less energy than conventional viscous salt milling and produces a highly dispersible, very strong β-phase copper phthalocyanine which is useful as a pigment in a variety of applications.

7 Claims, No Drawings

PROCESS FOR PREPARING PIGMENTARY β-COPPER PHTHALOCYANINE

BACKGROUND OF THE INVENTION

This invention relates to the preparation of copper phthalocyanine pigment and, particularly, to an improved process for producing copper phthalcyanine in the β-phase by viscous salt milling crude copper phthalocyanine.

It is well-known in the art that crude copper phthalocyanine, produced from conventional organic reactions, lacks adequate pigmentary properties such as high strength and texture for direct use as a pigment. Consequently, a variety of methods are commonly practiced to convert crude copper phthalocyanine to a useful pigmentary form. Two well-known distinct crystal phases of copper phthalocyanine, i.e., the α-phase and the β-phase, can result from crude copper phthalocyanine depending upon the method used. The X-ray crystallographic definitions of the two phases of copper phthalocyanine are given in U.S. Pat. No. 2,556,730. In use, the α-phase exhibits a red-shade blue color and the β-phase exhibits a green-shade blue color.

Commonly practiced conversion methods such as acid-pasting, i.e., dissolving crude copper phthalocyanine in concentrated acid then precipitating by dilution with water, and dry salt-milling, i.e., dry grinding crude copper phthalocyanine with a large excess of inorganic salt, invariably produce the α-phase. The β-phase of copper phthalocyanine, which is the most stable phase, has been produced by a wide variety of methods, the most common of which are summarized below.

Ball milling crude copper phthalocyanine in the presence of organic liquids, preferably an oxygenated aliphatic liquid, to produce β-phase copper phthalocyanine is described in U.S. Pat. No. 2,556,726. A related method known as salt-solvent milling is described in U.S. Pat. Nos. 2,556,728 and 2,556,730. Salt-solvent milling comprises milling a limited quantity of organic liquid with crude copper phthalocyanine and a large excess of salt. Another method described in U.S. Pat. No. 3,051,718 comprises acid-swelling a ball-milled chlorine-free copper phthalocyanine, utilizing a concentrated acid having a dissociation constant less than about $5 \times 10^{-2}$ such as phosphoric.

Although the above-described methods can produce satisfactory pigmentary copper phthalocyanine in the β-phase, these methods employ large quantities of inorganic salts, organic liquid or concentrated acid, are not very economical, and can require additional processing steps, e.g., separation of the pigment from the organic liquid by steam stripping.

One attempt to overcome the disadvantages of the prior art is described in U.S. Pat. No. 2,982,666. The method, known as viscous milling or viscous salt milling, comprises preparing a mixture of crude pigment, optionally inorganic salt, and organic conditioning agent to form a discontinuous mass of tough, compacted granular particles, then subjecting the mass of particles to grinding by internal shearing action which develops an energy input more than four times that required for grinding crude pigment in the absence of the conditioning agent and more than four times that required for grinding a mixture if it were in the form of a pasty mass, and extracting the ground mass with water.

Although the conditioned pigments prepared by the method of U.S. Pat. No. 2,982,666 may exhibit improved strength, the conditioned pigment may not necessarily be in the β-phase and the energy required to provide sufficient shearing action to produce the conditioned pigment, whatever form, is quite high. For example, it is disclosed in U.S. Pat. No. 2,982,666 that relatively low shear mixing devices such as Werner-Pfleiderer mixers, which employ double mixing blades of the so-called "sigma" type, are incapable of exerting sufficient shearing action and that heavy duty dispersion mixers such as the Baker-Perkins dispersion mixer and Banbury mixer are required.

This invention provides for an improved viscous salt milling process which produces high quality β-copper phthalocyanine and eliminates the need for especially high shear and consequently requires much less energy than conventional viscous salt milling.

SUMMARY OF THE INVENTION

This invention is directed to an improved process for preparing copper phthalocyanine by viscous salt milling a mixture of crude copper phthalocyanine and an organic conditioning agent and recovering the pigment. The improvement for effecting the viscous salt milling at low energy input and for producing pigmentary copper phthalocyanine in the β-phase resides in adding ferric chloride ($FeCl_3$) to the mixture of crude copper phthalocyanine and organic conditioning agent. It is preferred that the mole ratio of $FeCl_3$ to CPC be from 0.08 to 3.5, and more preferably from 0.8 to 2.9. The energy input needed to effect the viscous salt milling of the mixture in a milling device is generally from 10% to 50%, and preferably less than 20%, in excess of the energy required to operate the milling device empty for the same period at the same speed. The β-copper phthalocyanine produced by this process exhibits exceptionally high tinctorial properties, such as strength, transparency and dispersibility.

DETAILED DESCRIPTION OF THE INVENTION

The term viscous salt milling as used herein refers to a process for milling a discontinuous mass of tough, compacted granular particles, as described in U.S. Pat. No. 2,982,666. These aggregated masses may be in the form of large lumps or may be quite small giving the appearance of sandy granules. To maintain the mass in the viscous state, the amount of organic conditioning agent is such that the mass during grinding is not powdery and fluffy, because of too little organic conditioning agent, or doughy and pasty as prior art processes which use large amounts of solvents or organic liquids.

Organic conditioning agents suitable for use in this process are described in U.S. Pat. No. 2,982,666 and discussed hereinunder.

The organic conditioning agents used in this process are at least slightly water soluble. Even conditioning agents having a solubility in water at 25°C. less than 0.1% by weight are satisfactory as long as they are at least slightly soluble in water. When conditioning agents having low solubility in water are utilized the volume of water employed for separation of the conditioning agent from the conditioned pigment is large enough relative to the amount of conditioning agent to extract the latter from the milled mixture.

Also, the agent should be liquid or semiliquid at the temperature of the mixture during milling. In addition conditioning agents that have a boiling point well above the temperature produced during milling are preferred, since they are relatively nonvolatile at milling temperatures. As a result, such conditioning agents do not evaporate and disappear from the mix during milling.

The organic conditioning agents which are useful in this process are selected from the group consisting of polyols, ethers of polyols, esters of polyols, chlorinated derivatives of said polyols, and mixtures of such polyols, ethers, esters and chlorinated derivative. The preferred type of such agents may be broadly represented by the empirical formula $(C_xH_yO_z)(X)_m$ in which C is carbon, H is hydrogen, O is oxygen, X is selected from the group consisting of radicals OH, $OCH_3$, $OC_2H_5$, $OC_3H_7$, $OOCCH_3$, Cl and combinations of such radicals; $x$ is at least two, $y$ is at least four, $z$ is any number including zero, and $m$ is at least two. Examples of such polyols are glycerol, 1,4-butane diol, trimethylol propane, 1,5-pentane diol, 1,2,6-hexane triol, hexylene glycol, sorbitol, and neopentyl glycol.

The most common group of these useful conditioning agents which comes within the foregoing broad formula is the class of alkylene and polyalkylene glycols and their mono- and di-ethers, esters and chlorides which may be represented by the following formula: $(X)(C_2H_3RO)_nC_2H_3R(X)$ where C is carbon, H is hydrogen, R is selected from the group consisting of hydrogen, methyl or ethyl, O is oxygen, X is selected from the group consisting of the radicals OH, $OCH_3$, $OC_2H_5$, $OC_3H_7$, $OC_4H_9$, $OOCCH_3$, Cl and combinations of such radicals, and $n$ is any number including zero.

Examples of polyols represented by this more common type agent useful in this process are ethylene glycol, diethylene glycol, triethylene glycol, tetraethylene glycol, propylene glycol, dipropylene glycol, tripropylene glycol, tetrapropylene glycol, polyethylene glycols (molecular weights above the tetra compound), polypropylene glycols, polybutylene glycols, ethylene glycol mono-methyl, ethyl and butyl ethers, corresponding diethylene glycol mono-ethers, triethylene glycol mono-methyl and ethyl ethers, propylene glycol mono-methyl ether, corresponding dipropylene and tripropylene glycol mono-methyl ethers, polyethylene glycol mono-methyl ethers (molecular weights from 350 to 750), diethylene glycol diethyl ether, methyl Cellosolve acetate, Carbitol acetate, methoxy triglycol acetate, polyethylene glycol chloride and triethylene glycol dichloride.

While polyols and their described derivatives which are liquid at ordinary temperatures are preferred, they may be solids with a melting point ranging up to about 150°C., or even higher. It is only important that the polyol be a liquid under the milling conditions. Since considerable heat may be produced in the milling, such solid agents may give satisfactory results under conditions where (a) the developed heat is great enough to melt the agent or (b) in certain cases, a small amount of water, sufficient to dissolve or at least partially dissolve the agent, is present. Also, if desired, additional heat can be applied during milling in order to employ high melting polyols in liquid form. On the other hand, if a low boiling point conditioning agent is employed, the mixture may be cooled during milling to prevent undue loss of such agent because of evaporation. It is preferred that the milling be conducted at a temperature of at least 60°C. and more preferably from 70°C. to 90°C.

In order to obtain a viscous mass upon milling, it is important that the proper amount of organic conditioning agent be incorporated in the mixture. If too little conditioning agent is employed, based on the total weight of solids in the mixture, the mixture remains powdery and may not result in high quality pigment. If too high a proportion of conditioning agent is added so that the mixture exceeds its saturation point, i.e., the point above which the mixture becomes continuous and pasty, the product may be similarly adversely affected. For most pigment mixtures, from 3% to 25% by weight of organic conditioning agent, based on the total weight of the solids in the mixture to be milled, is sufficient to maintain a viscous mass during milling.

The solids in the mixture to be milled are composed of crude copper phthalocyanine, $FeCl_3$, grinding aid, and any other solid additives that may be present. The grinding aid should be a water soluble inorganic salt such as sodium chloride. Equivalents of sodium chloride as the solid grinding aid in this process are other water soluble inorganic salts which do not react with $FeCl_3$, such as sodium sulfate. The amount of grinding aid relative to the amount of crude copper phthalocyanine is not critical. Both high and low amounts of grinding aid may be used, the selection being largely a matter of economics and efficiency of the milling operation. In general, it is not economical and no advantage is obtained by using more than about nine parts by weight of grinding aid per part of crude copper phthalocyanine. At least 25% by weight of grinding aid, based on the weight of the crude copper phthalocyanine, is preferred for best results.

Although this invention is not bound by any particular theory of operation, it is believed that the addition of $FeCl_3$ to the mixture of crude copper phthalocyanine, organic conditioning agent, and grinding aid is primarily responsible for the ease of milling the mixture and for the high strength, dispersible β-copper phthalocyanine which is produced. The mole ratio of $FeCl_3$ to crude copper phthalocyanine in the mixture is preferably from 0.08 to 3.5, and more preferably from 0.8 to 2.9. Larger amounts of $FeCl_3$ should not be used because α-copper phthalocyanine will form and contaminate the β-copper phthalocyanine. By utilizing $FeCl_3$ in accordance with the invention, the need for high shear, and therefore energy input, is greatly reduced and the rate of size reduction of the crude copper phthalocyanine in the mixture is increased. The process results in the production of a high quality β-copper phthalocyanine at lower cost than conventional viscous salt milling such as that described in U.S. Pat. No. 2,982,666.

A variety of conventional mixing or milling devices can be used to mill the mixture of crude copper phthalocyanine, $FeCl_3$, organic conditioning agent, and grinding aid. For example, mixers which employ double mixing blades of the so-called "sigma" type, such as a Baker-Perkins Sigma Blade Mixer or Standard Mill fitted with a sigma blade mixer, are quite satisfactory for practicing the invention. Heavy duty dispersion mixers, such as a Banbury mixer, can be used. However, in the practice of this invention there is no need for the severe milling conditions, i.e., intensive high shear, provided by such heavy duty equipment. In any case, the energy input needed to effect the viscous salt milling operation in accordance with this invention using a conventional mixing device, is generally from 10% to 30%, and preferably less than 20%, in excess of the energy input required to operate the milling device empty for the same period at the same speed. This is far less than the energy input required for conventional viscous salt milling.

Because of the physical nature of the viscous mass, conventional milling devices such as ball mills, rod mills, roller mills and edge runners, also known as pan mixers, cannot be used in practicing this invention, as such devices do not provide adequate shearing action at any energy input.

After milling the pigment can be removed from the FeCl$_3$, grinding aid, and organic conditioning agent by adding the milled mixture to water or dilute aqueous acid to form an aqueous slurry of pigment. Extraction of the pigment utilizing dilute aqueous acid, e.g., from 0.01 N to 1.0 N, is decidedly preferred to insure that the pigment is substantially completely separated from the other components of the mixture. Suitable acids are any of the mineral acids such as hydrochloric and sulfuric acids. To insure complete recovery of the pigment, it is preferable to heat the aqueous slurry of pigment to from 70°C. to 95C., and more preferably from 80°C. to 90°C., prior to separation of the pigment from the aqueous slurry. The pigment can be separated from the aqueous slurry by any mechanical process, such as filtration. To insure that the pigment is free of residual salts, the pigment is preferably washed with water. The pigment can be dried after washing and be used directly as a wet filter cake.

The filter cake containing the pigment, i.e., β-copper phthalocyanine, may be utilized in several ways. For example, the pigment may be flushed directly from the aqueous cake into oil vehicles by methods well-known in the art. In such methods, the addition of oil vehicles to the cake causes separation of the water in one phase from the oil and pigment in another phase. The water is then separated by any means such as by decantation. Alternatively, the cake may be converted into various aqueous pulp forms for use in water paints and other fields; or it may be dried for use as a dry color. Thee β-copper phthalocyanine prepared according to this invention exhibits soft texture and small particle size. As a result the β-copper phthalocyanine may be used directly in the dry state for incorporation in various compositions, such as paints, inks, rubber, and linoleum.

If desired, acid-insoluble, inert extenders or substrata such as blanc fixe and titanium dioxide, may be incorporated with the mixture of crude copper phthalocyanine, FeCl$_3$, organic conditioning agent, and grinding aid in the milling step of this process for the purpose of manufacturing extended colors or lakes.

The following examples illustrate the invention.

EXAMPLE 1

A conventional Baker-Perkins sigma blade mixer having a capacity of two cubic inches (32.8 cubic centimeters) is charged with 4.5 g of crude copper phthalocyanine, 1.5 of anhydrous FeCl$_3$, 29.0 g of micropulverized sodium chloride, and 4.42 g of diethylene glycol. The charge is milled at 54 r.p.m. for three hours. The temperature during milling is maintained from 80°C. to 90°C. by passing steam through the mill jacket. The milled charge is then added to 500 cc of an acidic aqueous solution containing 5 cc of 98% sulfuric acid. The resulting slurry is heated to 95°C. and maintained at that temperature for one hour and thirty minutes. The pigment is isolated by filtering, washing with water to remove any residual sulfate and drying overnight at 180°F. (82°C.) to give a substantially quantitative yield of β-copper phthalocyanine exhibiting the bright green-shade blue color.

When this pigment is tested by rubout on a Hoover muller in lithographic varnish (a well-known and conventional test for the tinctorial properties of colored pigments), it is found to be about 15% stronger and greener in tint with a darker and more transparent masstone than a commercially available β-copper phthalocyanine pigment used as a reference standard tested in the same manner.

CONTROL

The procedure of Example 1 is followed except that the 1.5 g of anhydrous FeCl$_3$ is omitted and 30.5 g of sodium chloride is used instead of 29.0 g to maintain the same salt level.

When tested in the manner of Example 1, the resulting pigment is found to be about 15% weaker and less green in tint with a duller, lighter, less transparent masstone than the β-copper phthalocyanine pigment of Example 1.

EXAMPLE 2

The procedure of Example 1 is followed except that 2.5 g of anhydrous FeCl$_3$ is used. The β-copper phthalocyanine which results exhibits tinctorial properties which are substantially identical to those of the β-copper phthalocyanine pigment of Example 1.

EXAMPLES 3–9

The procedure of Example 1 is followed except that the milling temperature is 70°C. to 80°C. and the amounts of FeCl$_3$ and NaCl used are shown in Table I.

The products of Example 3–7 and 9 are found to be substantially pure β-copper phthalocyanine. The product of Example 8 is found to contain a trace amount of α-copper phthalocyanine. All the products of Examples 3–9 exhibit tinctorial properties which are far superior to the Control and significantly better than the commercially available β-copper phthalocyanine pigment used as a reference standard.

TABLE I

| Example | FeCl$_3$(g) | NaCl(g) |
|---|---|---|
| 3 | 0.1 | 30.4 |
| 4 | 0.5 | 30.0 |
| 5 | 1.5 | 29.0 |
| 6 | 2.0 | 28.5 |
| 7 | 2.5 | 28.0 |
| 8 | 3.0 | 27.5 |
| 9 | 3.5 | 27.0 |

EXAMPLE 10

A conventional Read-Standard Mill fitted with a sigma blade mixer having a capacity of 1½ gallons (5.7 l) is charged with 324 g of crude copper phthalocyanine, 108 g of anhydrous FeCl$_3$ and 2080 g of micropulverized sodium chloride. The charged is milled at 28 r.p.m. for five minutes after which 321 g of ethylene glycol is added to the mill. The charge is then milled for three hours at from 70°C. to 90°C. The maximum energy input during milling is 440 volts, 1.4 amps, whereas the energy input for operating the mill with no charge, i.e., empty, is 440 volts, 1.2 amps.

The milled charge is added to 12,000 cc of an aqueous solution containing 232 cc of 98% sulfuric acid. The resulting β-phase copper phthalocyanine pigment is isolated and tested in the manner of Example 1 and found to exhibit similar tinctorial properties to the β-copper phthalocyanine pigment of Example 1.

What is claimed is:

1. Improved process for preparing copper phthalocyanine by viscous salt milling a mixture of crude copper phthalocyanine, water soluble inorganic salt, and an organic conditioning agent selected from the group consisting of polyols, ethers of polyols, ester of polyols, chlorinated derivatives of said polyols, and mixtures of said polyols, ethers, esters, and said chlorinated derivatives, said organic conditioning agent being present in an amount from 3% to 25% by weight, based on the total weight of the solids in said mixture, and recovering the pigment, wherein the improvement for producing pigmentary copper phthalocyanine in the β-phase and for effecting the viscous salt milling at low energy input comprises adding $FeCl_3$ to said mixture prior to milling.

2. Process according to claim 1 wherein the mole ratio of $FeCl_3$ to crude copper phthalocyanine is from 0.08 to 3.5.

3. Process according to claim 1 wherein the mole ratio of $FeCl_3$ to crude copper phthalocyanine is from 0.8 to 2.9.

4. Process according to claim 1 wherein the energy input needed to effect the viscous salt milling of the mixture in a milling device is from 10% to 50% in excess of the energy input required to operate the milling device empty.

5. Process according to claim 1 wherein the organic conditioning agent is selected from diethylene glycol and ethylene glycol.

6. Process according to claim 5 wherein the viscous salt milling is conducted at a temperature from 70°C. to 90°C.

7. Process according to claim 6 wherein the pigment is recovered by the steps of (i) contacting the milled mixture with a dilute aqueous solution of acid to form an aqueous slurry of pigment, (ii) heating the aqueous slurry to a temperature from 70°C. to 95°C., (iii) filtering the aqueous slurry to isolate the pigment, and (iv) washing the pigment with water.

* * * * *